US012808340B2

(12) United States Patent
Fujita

(10) Patent No.: US 12,808,340 B2
(45) Date of Patent: Nov. 24, 2026

(54) OUTBOARD-MOTOR CYLINDER BLOCK AND MANUFACTURING METHOD THEREFOR

(71) Applicant: SUZUKI MOTOR CORPORATION, Hamamatsu (JP)

(72) Inventor: Masahiro Fujita, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 43 days.

(21) Appl. No.: 19/233,849

(22) Filed: Jun. 10, 2025

(65) Prior Publication Data

US 2026/0043372 A1 Feb. 12, 2026

(30) Foreign Application Priority Data

Aug. 7, 2024 (JP) ................................ 2024-130744

(51) Int. Cl.
*F02F 1/10* (2006.01)
*B22D 25/02* (2006.01)
*C25D 11/24* (2006.01)

(52) U.S. Cl.
CPC ................ *F02F 1/10* (2013.01); *B22D 25/02* (2013.01); *C25D 11/246* (2013.01)

(58) Field of Classification Search
CPC .................................. B22D 25/02; F02F 1/10
See application file for complete search history.

(56) References Cited

U.S. PATENT DOCUMENTS

2016/0138179 A1* 5/2016 Murakami ................ F02F 3/14 205/50
2017/0152795 A1* 6/2017 Yamashita ................ F02F 3/10
2025/0376939 A1* 12/2025 Murakami .............. F01P 3/202

FOREIGN PATENT DOCUMENTS

JP 2023-072944 A 5/2023

* cited by examiner

*Primary Examiner* — Kevin A Lathers
(74) *Attorney, Agent, or Firm* — Stein IP, LLC

(57) ABSTRACT

An outboard-motor cylinder block, which has, on an outer peripheral surface thereof, a plurality of screw holes for fastening the outboard-motor cylinder block and a member to be fastened, is manufactured by casting a cylinder block body using an aluminum alloy as a base material, the cylinder block body having a provisional hole smaller in an inner diameter than the screw hole at a place where the screw hole is planned to be formed; forming an anodized film on a surface of the cylinder block body where the aluminum alloy is exposed; sealing pores of the anodized film to form a sealed anodized film; threading the provisional hole to form the screw hole by removing the anodized film on an inner circumferential surface of the provisional hole such that the aluminum alloy is exposed to an inner circumferential surface of the screw hole; and forming a chemical conversion coating film on a surface of the sealed anodized film and a surface of the aluminum alloy exposed to the inner circumferential surface of the screw hole.

5 Claims, 15 Drawing Sheets

OUTBOARD-MOTOR CYLINDER BLOCK AND MANUFACTURING METHOD THEREFOR

CROSS-REFERENCE TO RELATED APPLICATION

This Application claims priority from Japanese Patent Application No. 2024-130744 filed Aug. 7, 2024, which is incorporated herein by reference in its entirety.

BACKGROUND OF THE INVENTION

The present invention relates to an outboard-motor cylinder block and to a manufacturing method therefor.

In an industrial internal combustion engine, in order to maintain performance, cooling water is circulated to control the temperature of the internal combustion engine. For automobile cooling water used, in general, water with additives such as ethylene glycol is used. When the cooling water is depleted, it is necessary to replenish the supply. On the other hand, in an engine for an outboard motor, seawater (saltwater), which can be easily obtained from the environment during use, is taken in and is used as cooling water.

However, since parts of an outboard motor are made of a large number of types of metal materials, electrical potential differences occur due to differences in the metal materials of the parts that are in contact with seawater, and the metal material having a low natural electrical potential dissolves into seawater. This can be a cause of occurrence of corrosion. In particular, an aluminum alloy, which is used for a cylinder block of the outboard motor, is a metal in which corrosion more easily occurs compared with other materials.

In order to prevent such occurrence of corrosion, for example, JP 2023-072944 A discloses a method for an outboard-motor cylinder block body having a cylinder bore and a water jacket around the cylinder bore, including: pressing an area of the inner circumferential surface of the cylinder bore including the boundary between an aluminum alloy as a base material and cast iron of a cylinder sleeve cast therein with an elastic jig; in this state, subjecting the cylinder block body to an anodizing treatment to form an anodized film on a surface part of the aluminum alloy; and then carrying out a sealing treatment to seal the pores of the anodized film, thereby forming the sealed anodized film on a joining surface to be joined to a cylinder head and the inner peripheral surface of the water jacket.

SUMMARY OF THE INVENTION

However, since components such as an exhaust manifold, an oil pan, various sensors, and wires are fastened to the cylinder block of an outboard-motor, a large number of screw holes are present in the cylinder block. For that reason, when the anodizing treatment is carried out on the outboard-motor cylinder block, since the anodized film is formed in the screw holes as well, the inner diameter of the screw holes changes, workability at the time of screw fastening is deteriorated, and the screws are likely to be broken because attachment is forcibly carried out. The screw holes are provided in various directions. Even if water rinsing, air blowing, and the like are carried out at the time of the anodizing treatment, it is difficult to perfectly clean all of the large number of screw holes. When anodizing liquid remains in the screw holes, there is a problem in that corrosion of the base material is caused after just a few days.

Therefore, an object of the present invention is to provide an outboard-motor cylinder block and a method of manufacturing therefor in which screw holes having a predetermined inner diameter can be formed even if an outboard-motor cylinder block is subjected to an anodizing treatment, corrosion of a base material due to remaining of treatment liquid can be prevented, and corrosion resistance against cooling water such as seawater can be further improved.

In order to achieve the object described above, the present invention is, as an aspect thereof, an outboard-motor cylinder block having a cylinder bore on a joining surface to be joined to a cylinder head and a water jacket around the cylinder bore, and having, on an outer peripheral surface thereof, a screw hole for fastening the outboard-motor cylinder block and a member to be fastened, in which an aluminum alloy as a base material of the outboard-motor cylinder block is covered with an anodized film on a surface around an opening of the screw hole and an inner circumferential surface of the water jacket, pores of the anodized film being sealed with a sealing product, and the sealed anodized film being further covered with a chemical conversion coating film, whereas the aluminum alloy is covered with the chemical conversion coating film on an inner circumferential surface of the screw hole.

The present invention is, as another aspect, a method of manufacturing an outboard-motor cylinder block, the outboard-motor cylinder block having, on an outer peripheral surface thereof, a plurality of screw holes for fastening the outboard-motor cylinder block and a member to be fastened, the method including: casting a cylinder block body using an aluminum alloy as a base material, the cylinder block body having a cylinder bore and a water jacket around the cylinder bore formed on a joining surface to be joined to a cylinder head, and having a provisional hole smaller in an inner diameter than the screw hole at a place where the screw hole is planned to be formed; forming an anodized film on a surface of the cylinder block body where the aluminum alloy is exposed, by carrying out an anodizing treatment; sealing pores of the anodized film to form a sealed anodized film by carrying out a sealing treatment; threading the provisional hole to form the screw hole by removing the anodized film on an inner circumferential surface of the provisional hole such that the aluminum alloy is exposed to an inner circumferential surface of the screw hole; and forming a chemical conversion coating film on a surface of the sealed anodized film and a surface of the aluminum alloy exposed to the inner circumferential surface of the screw hole.

According to the present invention as described above, an aluminum alloy which is the base material of the outboard-motor cylinder block is covered with the sealed anodized film, the sealed anodized film is further covered with the chemical conversion coating film; however, on the inner circumferential surface of the screw hole, the aluminum alloy is covered with the chemical conversion coating film, and therefore, the screw hole having a predetermined inner diameter can be formed, corrosion of the base material due to remaining of treatment liquid can be prevented, and corrosion resistance against cooling water such as seawater can be further improved.

DESCRIPTION OF PREFERRED EMBODIMENTS

An embodiment of an outboard-motor cylinder block and a method of manufacturing therefor according to the present invention is explained below with reference to the accompanying drawings.

Figure 1:
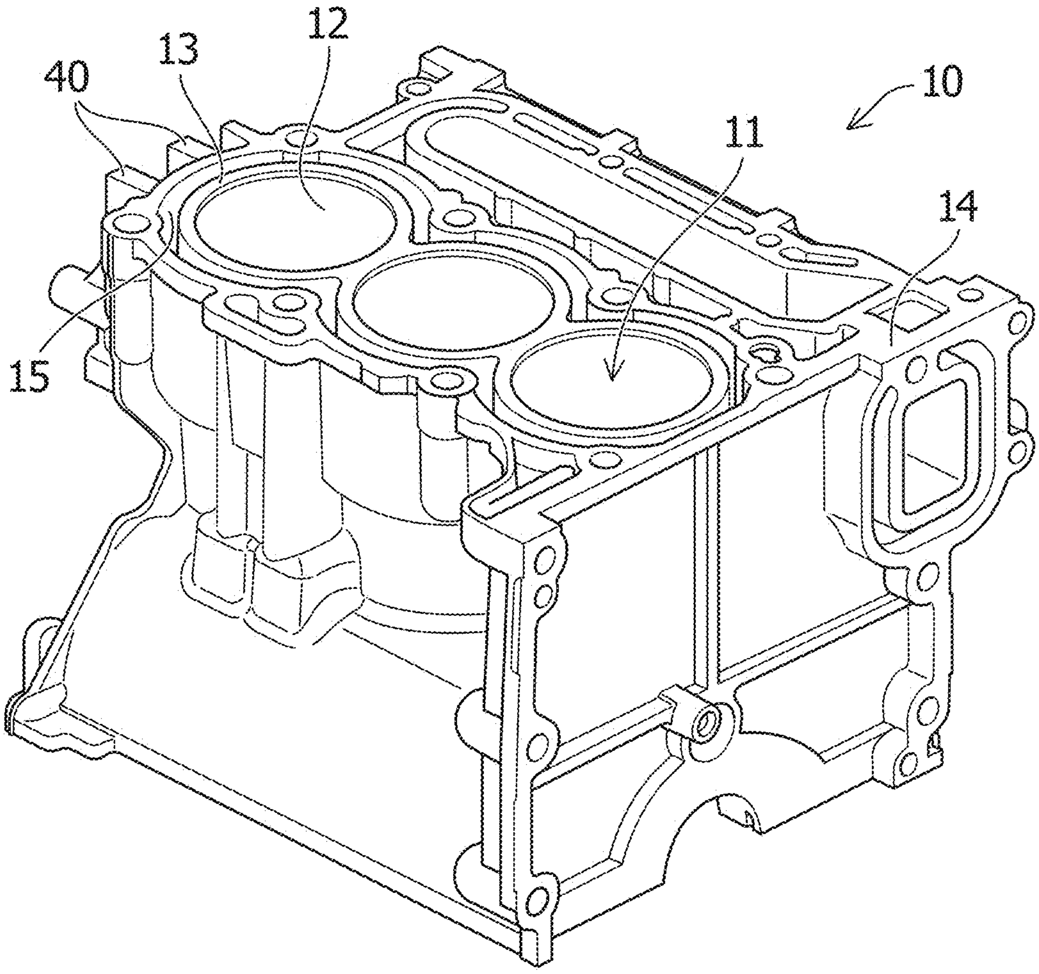
FIG. 1 is a perspective view from a cylinder head side, illustrating an example of an outboard-motor cylinder block.
Figure 2:
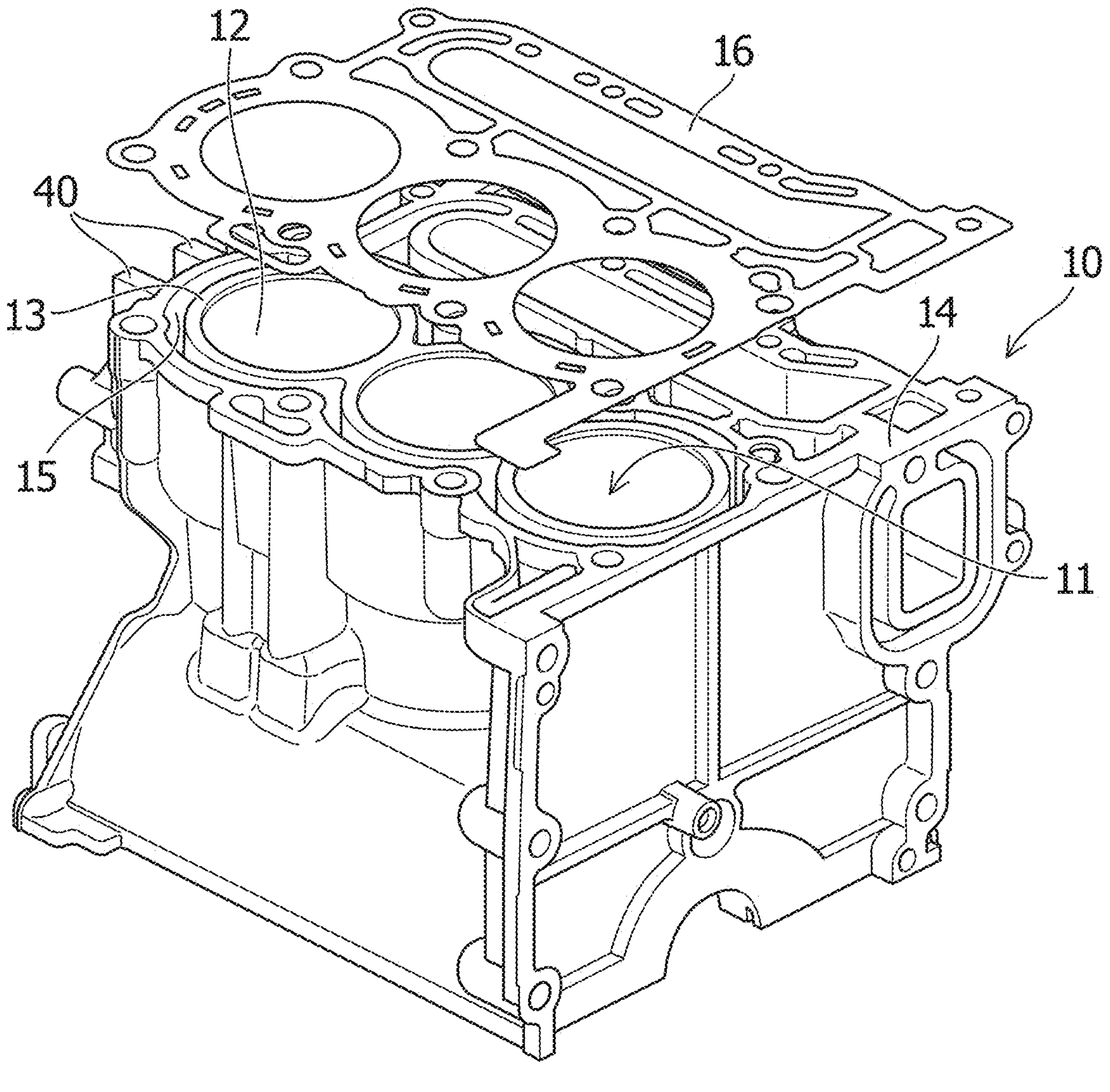
FIG. 2 is a perspective view illustrating the outboard-motor cylinder block illustrated in FIG. 1 and a gasket interposed between the cylinder block and the cylinder head.

First, a cylinder block body that is a treatment target of the method of manufacturing the outboard-motor cylinder block according to the present invention is explained. As illustrated in FIG. 1 and FIG. 2, in a cylinder block body 10, a plurality of cylinder bores 11 and a water jacket 15 around the cylinder bores 11 are formed on a joining surface 14 to be joined to a cylinder head (not shown). Cylindrical cylinder sleeves 12 are installed on inner circumferential surfaces of the cylinder bores 11. The cylinder block body 10 is made of aluminum alloy. However, the cylinder sleeves 12 may be made of the aluminum alloy or may be made of cast iron.

As illustrated in FIG. 2, the cylinder block body 10 is joined to the cylinder head via a gasket 16. Note that, in these figures, the cylinder block body 10 is illustrated in a state in which three cylinder bores 11 are disposed side by side in the horizontal direction. However, in an actual outboard motor (not shown), an outboard-motor cylinder block is mounted in a state in which the cylinder bores 11 are disposed side by side in the vertical direction. The number of cylinder bores 11 may be one for a single cylinder engine.

Components such as an exhaust manifold, an oil pan, and various sensors, wires, and the like are fastened to the outer peripheral surface of the cylinder block body 10 by screws, and therefore, the outboard-motor cylinder block includes a plurality of screw holes (not shown) for fastening these members to be fastened and the outboard-motor cylinder block 10. Note that, as illustrated in FIG. 1, the cylinder block body has a complicated shape, but generally has a hexahedron shape. The outer peripheral surface of the cylinder block body 10 means six surfaces of the hexahedron shape. As illustrated in FIG. 2, the cylinder head is disposed on the joining surface 14 among the six surfaces via the gasket 16. Therefore, the screw holes are formed on the other five surfaces.

Figure 3:
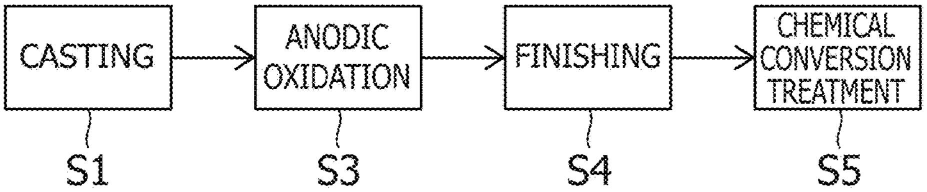
FIG. 3 is a flowchart showing an embodiment of a method of manufacturing an outboard-motor cylinder block according to the present invention.

The embodiment of the method of manufacturing the outboard-motor cylinder block according to the present invention includes, as illustrated in FIG. 3, a casting step S1 of casting, with an aluminum alloy, a cylinder block body including, in formation planned parts of the screw holes, provisional holes smaller in an inner diameter than the screw holes, an anodizing treatment (anodic oxidation) step S3 of forming a sealed anodized film on the surface of the aluminum alloy portion of the cylinder block body, a finishing step S4 of cutting the provisional holes and forming the screw holes such that anodized film on the inner circumferential surfaces of the provisional holes is removed and the aluminum alloy is exposed to the inner circumferential surfaces of the screw holes, and a chemical conversion treatment step S5 of forming a chemical conversion coating film on the surface of the anodized film and the surface of the aluminum alloy exposed to the inner circumferential surfaces of the screw holes. The steps are explained in detail below.

In the casting step S1, the method of casting the outboard-motor cylinder block of the related art can be used and a cylinder block body, which is a treatment target in the next and subsequent steps, can be obtained using, for example, a die cast method. The material of the cylinder block body is not particularly limited if the material is an aluminum alloy and may contain various alloy components such as silicon and copper. Note that, when the cylinder block body is cast, a cylinder sleeve may be cast into the cylinder block body, as described in JP 2023-072944 A.

Figure 4:
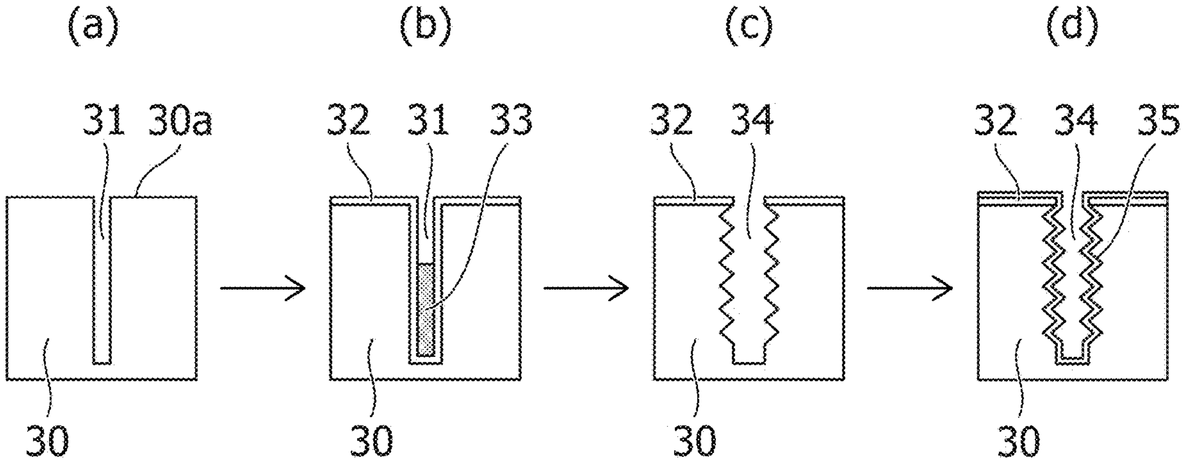
FIG. 4 shows cross-sectional views schematically illustrating the screw hole in the embodiment in the flowchart shown in FIG. 3.

The cylinder block body obtained by the casting step S1 is manufactured in a state in which, as illustrated in FIG. 4(*a*), a provisional hole 31 having an inner diameter smaller than a screw hole to be finally manufactured is opened in an attachment section 30 of a member to be fastened of the cylinder block body.

Subsequently, in the anodizing treatment step S3, first, the cylinder block body is immersed in treatment liquid and subjected to electrolytic treatment and a porous anodized film is formed on the surface of the cylinder block body. The aluminum alloy on the surface of the cylinder block body is dissolved by the electrolytic treatment, the dissolved aluminum combines with oxygen in the treatment liquid, and the anodized film containing aluminum oxide as a primary component is formed on the surface of the cylinder block body.

As the treatment liquid of the anodizing treatment, any one of an acidic bath of sulfuric acid, oxalic acid, phosphoric acid, and chromic acid, and a basic bath of sodium hydroxide, sodium phosphate, and sodium fluoride may be used. The electrolytic treatment is carried out by applying a voltage with the cylinder block body 10 set as an anode and an electrode plate (not shown) of titanium, carbon, or the like set as a cathode.

As the film thickness of the anodized film formed by the anodizing treatment is larger, corrosion resistance of the anodized film tends to be improved. However, a deficiency of dielectric breakdown of the anodized film called burning of anodic films easily occurs and corrosion resistance of that part is particularly deteriorated. Thus, the film thickness of the anodized film is, for example, preferably 1 to 60 μm, and more preferably 3 to 20 μm.

In the anodizing treatment, when the aluminum in the base material of the cylinder block body 10 is oxidized and the film is formed, the aluminum changes to aluminum oxide, expanding the volume. That is, in the anodized film to be formed, approximately half of the film thickness is a permeation film permeating deeply into the base material surface of the aluminum alloy and the remaining approximately half of the film thickness is a grown film grown to the outer side from the base material surface.

Note that, when the cylinder sleeve 12 made of cast iron is cast into the inner circumferential surface of the cylinder bore 11, there is a problem in that the cylinder sleeve 12 made of cast iron corrodes if the cylinder sleeve 12 touches the treatment liquid. In such a case, since boundaries between the aluminum alloy and the cast iron are respectively present at an end portion on the cylinder head side and an end portion on a crankshaft side of the cylinder bore 11, it is preferable that the anodizing treatment be carried out in a state in which both the boundaries are pressed by elastic jigs (not shown) such as elastic bags that are inflatable with air. Accordingly, it is possible to prevent the treatment liquid from permeating to the portion of the cylinder sleeve 12 that is the cast iron and it is possible to carry out the anodizing treatment without the cast iron being dissolved. As another method, the inner circumferential surface of the cylinder bore 11 may be coated by a masking agent.

As an electrolytic method of the anodizing treatment, a direct-current electrolytic method and an alternating-current/direct-current (AC/DC) superimposed electrolytic method can be used. In both of the electrolytic methods, as explained above, an anodized film including a permeation film and a grown film is formed by an anodizing reaction, but anodized films having different characteristics are obtained.

The anodized film formed by the direct-current electrolytic method includes a cell linearly grown while eroding the base material surface in the perpendicular direction with respect to the base material surface. When many impurities or additives (silicon and the like) are present in the aluminum alloy, the cell does not grow in the periphery of the impurities or the additives near the surface, a recess is formed on the surface in a part where the impurities or the additives are deposited, and an anodized film having large surface roughness is formed. Furthermore, an anodized film having large variations in film thickness is formed.

The anodized film formed by the AC/DC superimposed electrolytic method has a structure in which cells substantially continuously form a spherical or elliptical shape at a height less than double of a cell diameter, and the cells gather to form grape-bunch-like shapes. Thus, in the anodized film formed by the AC/DC superimposed electrolytic method, a ratio of a volume of a hole included in the cell to the wall of the cell is low. In contrast, in the anodized film formed by the direct-current electrolytic method, since the cell is formed in a continuous tube shape, a ratio of a volume of a hole included in the cell to the wall of the cell is high.

In the anodized film formed by the AC/DC superimposed electrolytic method, even if impurities or additives that hinder the growth of the cell are present in a process of the growth of the cell, since the cell grows while avoiding and including the impurities or the additives, the growth of the cell is not hindered by the impurities or the additives, and the cell has film thickness substantially equal to that of the surface of the base material. In the anodized film formed by the AC/DC superimposed electrolytic method as explained above, since the growth direction of the cell is finely bent in random directions with respect to the surface of the base material, resistance against intruding water is generated in parts where the directions change. It is possible to prevent the water from advancing to the base material. Thus, the anodized film formed by the AC/DC superimposed electrolytic method has higher corrosion resistance than the anodized film formed by the direct-current electrolytic method.

After the cylinder block body is subjected to the anodizing treatment, it is preferable to carry out rinsing using water having few impurities, such as ion exchanged water or pure water. By carrying out the water rinsing, it is possible to remove the anodizing liquid adhering to the surface of the cylinder block body and it is possible to reduce the concentration of the remaining treatment liquid even in a narrow part where rinsing with water is difficult, such as the inside of the provisional hole 31.

In the anodizing treatment step S3, subsequently, sealing treatment for closing pores of the anodized film is carried out. The sealing treatment is carried out by immersing the cylinder block body, in which the anodized film is formed, in sealing treatment liquid or applying the sealing treatment liquid to the cylinder block body. Accordingly, pores of the porous anodized film are closed, and it is possible to improve corrosion resistance of the anodized film.

For the sealing treatment, publicly-known methods such as a hydrothermal method, a boiling water method, a nickel acetate method, a low temperature sealing method, and a lithium hydroxide method can be adopted. As an example of the sealing treatment, a low temperature sealing method is explained. As sealing treatment liquid of the low temperature sealing method, for example, liquid containing at least one selected from chromium and zirconium, and fluorine ions and further containing, in addition, cobalt, calcium, zinc, and the like can be used. With the low temperature sealing method, it is considered that the negatively charged fluorine ions adhere to gel portions charged in positive in pores of the anodized film and react and metal hydroxide such as chromium hydroxide is generated, and according to a series of reactions, the aluminum fluoride and the metal hydroxide coprecipitate, whereby sealing is carried out. The temperature of the sealing treatment liquid is preferably a range of 5 to 70 °C, pH is preferably a range of 2 to 7, and a treatment time is preferably a range of 1 to 900 seconds.

The sealing treatment liquid used in the present embodiment is preferably sealing treatment liquid containing chromium and zirconium from the viewpoint of corrosion resistance as explained in detail below. As a chromium source, trivalent chromium salt such as chromium nitrate, chromium sulfate, chromium chloride, chromium phosphate, chromium acetate, and chromium hydroxide can be used. As a cobalt source, cobalt nitrate, cobalt sulfate, cobalt chloride, and the like can be used. As a fluorine ion source, hydrogen fluoride, ammonium fluoride, potassium fluoride, sodium fluoride, and the like can be used. As a zirconium source, zirconium oxychloride, zirconium sulfate, zirconium nitrate, zirconium oxide, and the like can be used.

Note that, when the anodizing treatment is carried out in a state in which both the end portions of the cylinder sleeve are pressed by the elastic jigs explained above, it is preferable to also carry out the sealing treatment in the state in which both the end portions of the cylinder sleeve are pressed by the elastic jigs and detach the elastic jigs after the sealing treatment.

After the sealing treatment, in the same manner as after the anodizing treatment, it is preferable to carry out rinsing using water including few impurities, such as ion exchanged water or pure water. When the cylinder block body having the complicated shape is naturally dried without using a drying oven when the sealing treatment ends, the natural drying is easily carried out by carrying out hot water rinsing with hot water of 50 °C or higher after the water rinsing.

The attachment section 30 of the member to be fastened of the cylinder block body in which the anodized film sealed as explained above is formed is illustrated in FIG. 4(*b*). A sealed anodized film 32 is formed on a surface 30*a* of the attachment section 30 of the member to be fastened and the inner circumferential surface of the provisional hole 31 formed on the surface 30*a*. In both the anodizing treatment and the sealing treatment, even if water rinsing is carried out after the treatment, treatment liquid 33 is likely to remain on the inside of the provisional hole 31.

In the finishing step S4, as illustrated in FIG. 4(*c*), the inner circumferential surface of the provisional hole 31 is threaded to form a screw hole 34. At this time, the anodized film 32 on the inner circumferential surface of the provisional hole 31 is removed and the aluminum alloy, which is the base material, is exposed to the inner circumferential surface of the screw hole 34. For the threading, threading methods to be used for an aluminum alloy as a machining target, in general, such as cutting, can be widely adopted. Note that the anodized film 32 is generated on the inner circumferential surface of the provisional hole 31. The anodized film 32 is further improved in hardness than the base material. For that reason, a cutting tool may be a cutting tool that has been generally used or may be a cutting tool suitable for cutting a harder material.

By carrying out the finishing step S4 as explained above, even if the treatment liquid remains on the inside of the provisional hole 31, since the inner diameter of the provisional hole 31 is small and an amount of the remaining treatment liquid remaining in the provisional hole 31 is small, the treatment liquid can be removed at the time of the threading. Note that there is a wet method and a dry method as the threading. Since the remaining treatment liquid can be washed away by cutting liquid by the wet method, the threading of the wet method is preferable.

The chemical conversion treatment step S5 is carried out on the cylinder block body finished as explained above. By carrying out the chemical conversion treatment, as illustrated in FIG. 4(*d*), a chemical conversion coating film 35 is formed on the inner circumferential surface of the screw hole 34 to which the aluminum alloy is exposed and the chemical conversion coating film 35 is formed on the sealed anodized film on the surface 30*a* of the attachment section 30 of the member to be fastened (i.e., the surface around the opening of the screw hole 34). The inner circumferential surface of the screw hole 34 is in a state in which the aluminum alloy is exposed by the threading. However, corrosion resistance of the inner circumferential surface of the screw hole 34 can be improved by covering the aluminum alloy exposed in this way with the chemical conversion coating film 35.

As the chemical conversion treatment, publicly known chemical conversion treatment can be widely adopted. However, it is preferable to use chemical conversion treatment liquid including the same components as the primary components of the sealing treatment liquid used in the sealing treatment step. For example, when a low temperature sealing method is used in the sealing treatment step, as the chemical conversion treatment liquid, chemical conversion treatment liquid including chromium or zirconium used in the sealing treatment liquid is particularly preferable. As a chromium source, trivalent chromium salt can be used in the same manner as in the sealing treatment liquid. As a zirconium source, both organic compounds such as zirconium tetraethoxide and zirconium tetraisopropoxide and inorganic compounds such as zirconium chloride oxide, zirconium hydroxide, zirconium sulfate, and zirconium carbonate can be used. For such chemical conversion treatment, for example, ALSURF, which is a treatment agent manufactured by Nippon Paint Surf Chemicals Co., Ltd., can be used. By using the chemical conversion treatment liquid including the same component as the primary component of the sealing treatment liquid as explained above, since the same kind of component that is continuous in a plane are present in the chemical conversion coating film 35 and the anodized film 32, the chemical conversion coating film 35 is formed compatibly with the anodized film 32, a high barrier property is exerted, and corrosion resistance can be more substantially improved.

The film thickness of the chemical conversion treatment film formed in the chemical conversion treatment step S5 is preferably, for example, less than 1 μm, but is not particularly limited, because the film thickness depends on a type of chemical conversion treatment.

Note that it is preferable to, before carrying out the chemical conversion treatment, carry out degreasing and rinsing on the cylinder block body on which the finishing was carried out. It is preferable to, after the chemical conversion treatment, wash the surface of the cylinder block body with the water rinsing and dry the surface.

When the chemical conversion coating film is formed on the inner circumferential surface of the cylinder bore 11 by the chemical conversion treatment and the chemical conversion coating film is removed, the chemical conversion coating film on the inner circumferential surface of the cylinder bore 11 can be removed by carrying out, for example, honing. As the honing, the method of the related art can be adopted. The chemical conversion coating film can be removed by inserting a honing tool (not shown) into the cylinder bore 11 and rotating the honing tool to polish the inner circumferential surface of the cylinder bore 11 with a grind stone of the honing tool.

With the method of manufacturing the outboard-motor cylinder block in the present embodiment including the steps explained above, it is possible to obtain the outboard-motor cylinder block in which the aluminum alloy, which is the base material, is covered with the sealed anodized film 32 on the surface of the cylinder block body, for example, the surface 30*a* of the attachment section 30 of the member to be fastened (i.e., the surface around the outer edge of the screw hole 34) and the sealed anodized film 32 is further covered with the chemical conversion coating film 35 and, on the other hand, the aluminum alloy, which is the base material, is covered with the chemical conversion coating film 35 on the inner circumferential surface of the screw hole 34. Since the chemical conversion treatment film is as thin as less than 1 μm, the inner diameter of the screw hole 34 hardly changes and the screw can be comfortably tightened into the screw hole 34.

The same treatment as the treatment for the surface around the outer edge of the screw hole 34 is carried out on the inner circumferential surface of the water jacket 15. Therefore, it is possible to obtain the inner circumferential surface of the water jacket 15 in which the aluminum alloy, which is the base material, is covered with the sealed anodized film 32 and the sealed anodized film 32 is further covered with the chemical conversion coating film 35. The inner circumferential surface of the water jacket 15 is close to a combustion chamber, is placed under high-temperature conditions, and comes into contact with, or is highly likely to come into contact with, cooling water (seawater) and is a part where corrosion easily occurs. Therefore, corrosion resistance can be improved by further forming the chemical conversion coating film on the sealed anodized film.

In the finishing step S4, machining may be carried out until the anodized film on the joining surface 14 of the cylinder block body is removed and the aluminum alloy, which is the base material, is exposed. Such machining is not particularly limited if the joining surface 14 can be smoothed. For example, a machining method of rotating a plane milling cutter using a milling machine or carrying out plane grinding using a grinding machine can be used. When the anodized film on the joining surface 14 is removed in this way, it is preferable to, in the chemical conversion treatment step S5, form the chemical conversion coating film on the joining surface 14 to which the aluminum alloy is exposed. When cooling water (seawater) enters between the joining surface 14 of the cylinder block and the gasket, corrosion is likely to occur. However, even if the chemical conversion coating film is formed on the joining surface 14 after the finishing, smoothness of the joining surface 14 is maintained, a sealing property with the gasket is satisfactory, and the chemical conversion coating film is formed together with the inner circumferential surface of the water jacket 15. Therefore, it is possible to prevent permeation and improve corrosion resistance. In particular, when an inexpensive ADC material or AC material is used as the aluminum alloy, corrosion resistance is concerned. Therefore, there is great advantage in adopting the configuration explained above.

Figure 5:
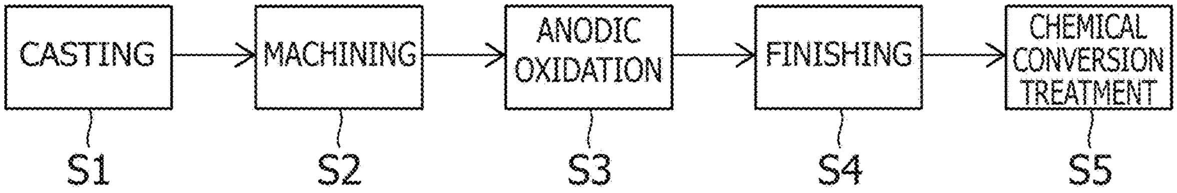
FIG. 5 is a flowchart showing another embodiment of a method of manufacturing an outboard-motor cylinder block according to the present invention.

The method of manufacturing the outboard-motor cylinder block of the present invention is not limited to the flowchart shown in FIG. 3. For example, as illustrated in FIG. 5, a machining step S2 of threading some of the provisional holes to form screw holes may be carried out between the casting step S1 and the anodizing treatment step S3. The machining step S2 is explained in detail below.

Figure 6:
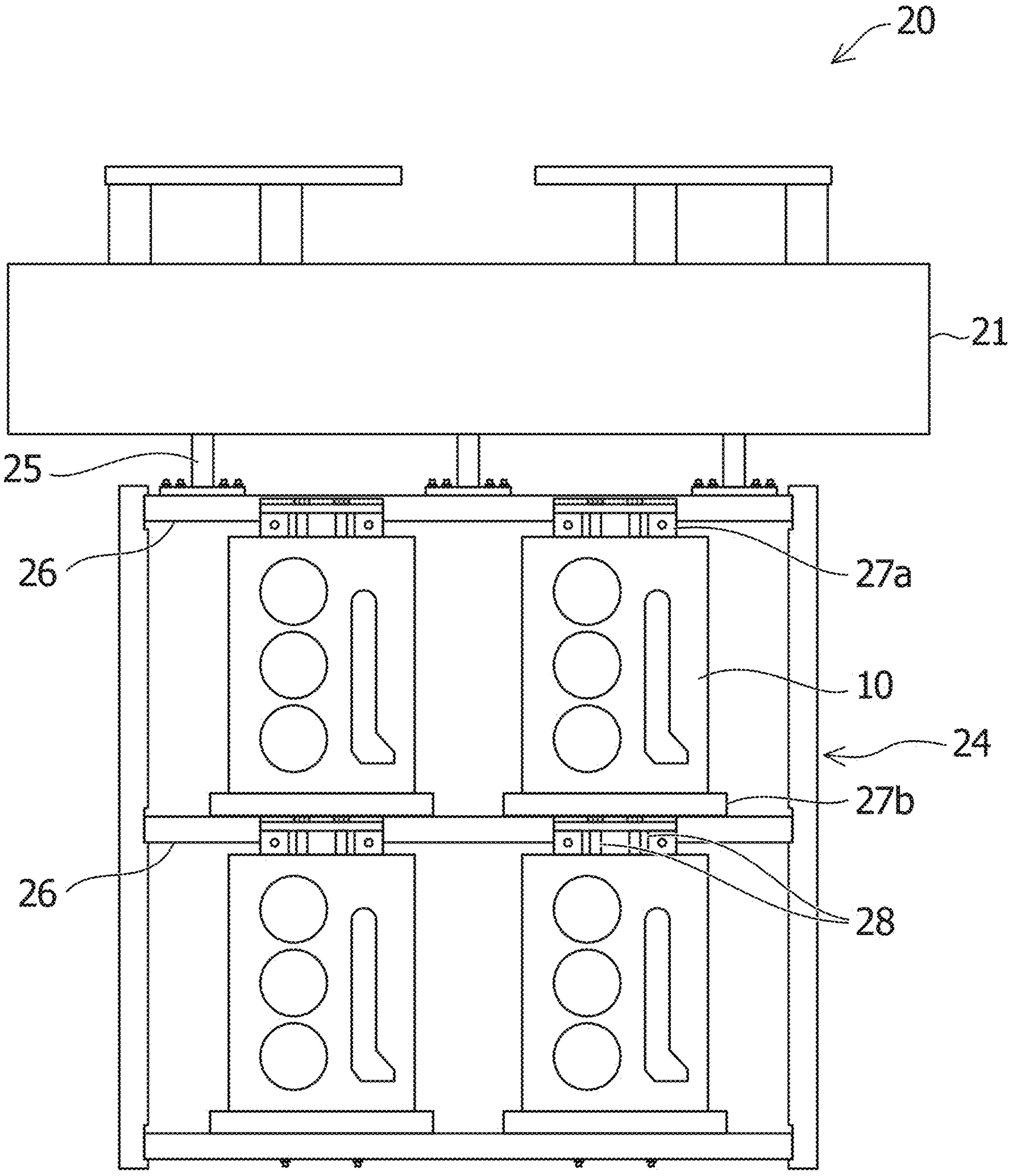
FIG. 6 is a front view schematically illustrating a carrying jig and a cylinder block body for an outboard motor used in the embodiment in the flowchart shown in FIG. 5.

In the anodizing treatment and the sealing treatment of the anodizing treatment step S3 and the chemical conversion treatment of the chemical conversion treatment step S5, in order to immerse the cylinder block body in the treatment liquid, as illustrated in FIG. 6, it is preferable to attach the cylinder block body to a carrying jig 20. The carrying jig 20 includes a control section 21 in an upper part and a hanging section 24 in a lower part in the vertical direction. A hook of a carrying device such as a hoist is attached to the control section 21. Movement of the carrying jig 20, lifting and lowering of the hanging section 24, and the like can be controlled.

The hanging section 24 includes three horizontal members 26 in the vertical direction and is configured to attach the cylinder block body 10 between the horizontal members 26. The control section 21 and the hanging section 24 are fixed by a coupling material 25. When the hanging section 24 rises and falls, the cylinder block body 10 can be immersed in treatment liquid (not shown) in various treatment tanks.

The cylinder block body 10 is attached to the horizontal members 26 from above and below using fixing members 27*a* and 27*b*. The horizontal members 26 are conductive and have a function of anode busbars. For anodizing of the cylinder block body 10, two screw holes (not shown) of the cylinder block body 10 and the anode busbars (the horizontal members 26) are fastened by current-carrying bolts (not shown) via spacers 28. Accordingly, an electric current can be passed through the cylinder block body 10 in the anodizing treatment. Note that the two screw holes are preferably provided at positions of the same height in the carrying jig 20.

Figure 7:
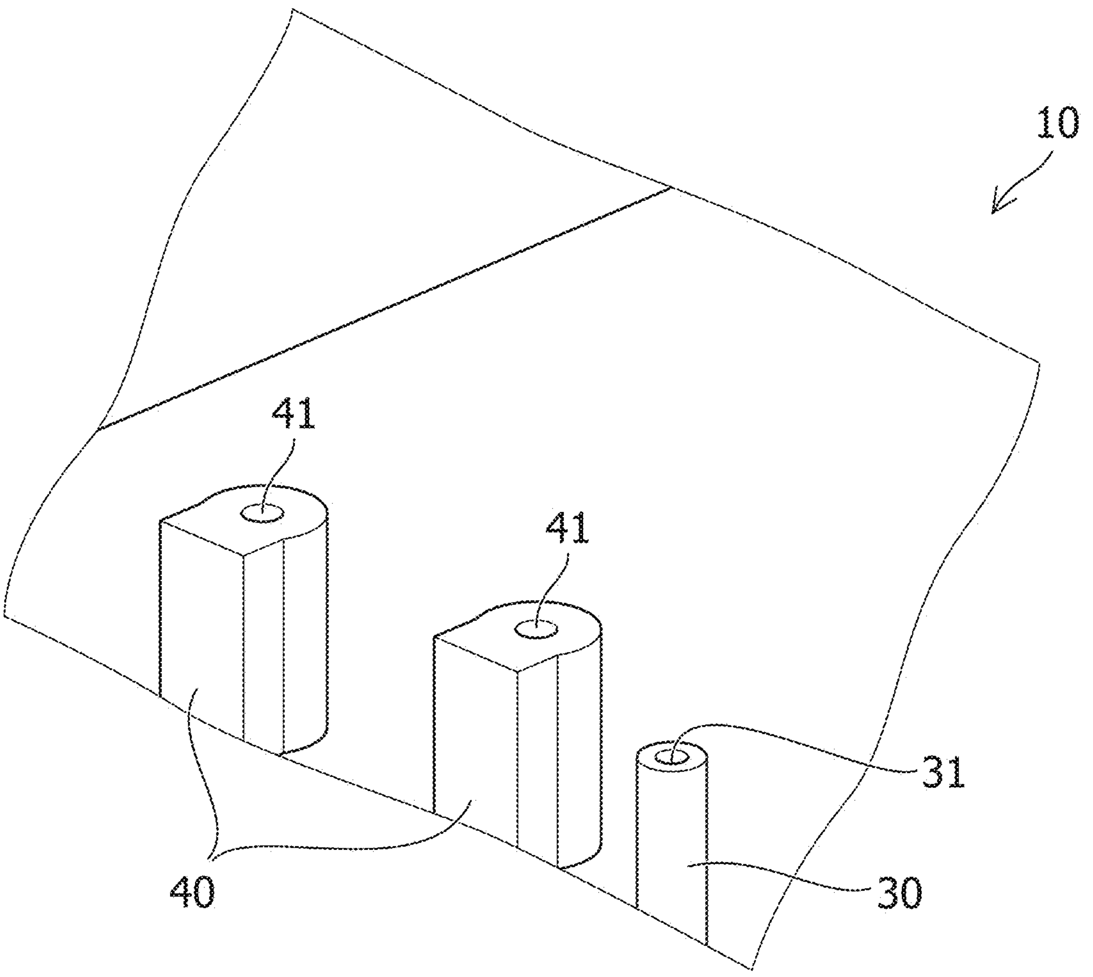
FIG. 7 is a perspective view schematically illustrating an example of a first provisional hole and a second provisional hole present on the outer peripheral surface of the cylinder block body for an outboard motor after casting S1 of the flowchart shown in FIG. 5.

In FIG. 7, anode busbar attachment sections 40 for fastening the cylinder block body 10 to the anode busbars as explained above and provisional holes 41 provided on distal end surfaces of the anode busbar attachment sections 40 are illustrated. In FIG. 1 and FIG. 2, the positions of the anode busbar attachment sections 40 in the cylinder block body 10 are illustrated. Like the provisional hole 31 provided on the distal end surface of the attachment section 30 of the member to be fastened explained above, the provisional holes 41 of the anode busbar attachment sections 40 are formed in the casting step S1 and have an inner diameter smaller than screw holes to be finally formed. A plurality of screw holes are formed in the cylinder block body 10. As explained below, since two types of screw holes formed through different steps are present, the screw hole provided in the attachment section 30 of the member to be fastened is referred to as first screw hole 34, and the screw holes provided in the anode busbar attachment sections 40 are referred to as second screw holes 42. A provisional hole for the first screw hole 34 is referred to as first provisional hole 31 and provisional holes for the second screw holes 42 are referred to as second provisional holes 41.

Figure 8:
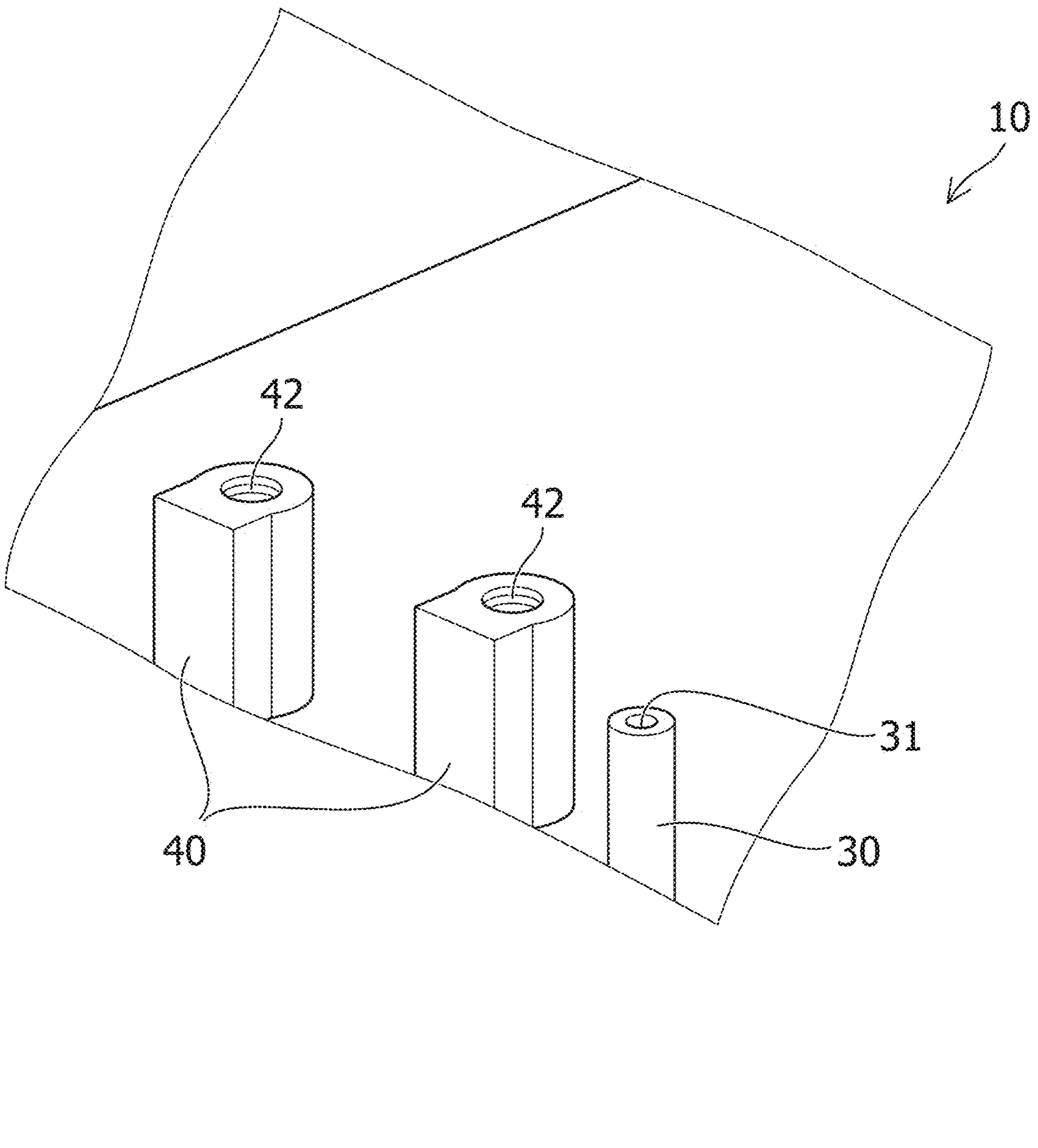
FIG. 8 is a perspective view schematically illustrating an example of the first provisional hole and the second provisional hole present on the outer peripheral surface of the cylinder block body for an outboard motor after machining step S2 of the flowchart shown in FIG. 5.

In the machining step S2, the second provisional holes 41 of the anode busbar attachment sections 40 are threaded to form the second screw holes 42 on the distal end surfaces of the anode busbar attachment sections 40, as illustrated in FIG. 8. The threading can be carried out in the same manner as the threading in the finishing step S4. Therefore, explanation of the threading is omitted here.

Figure 9:
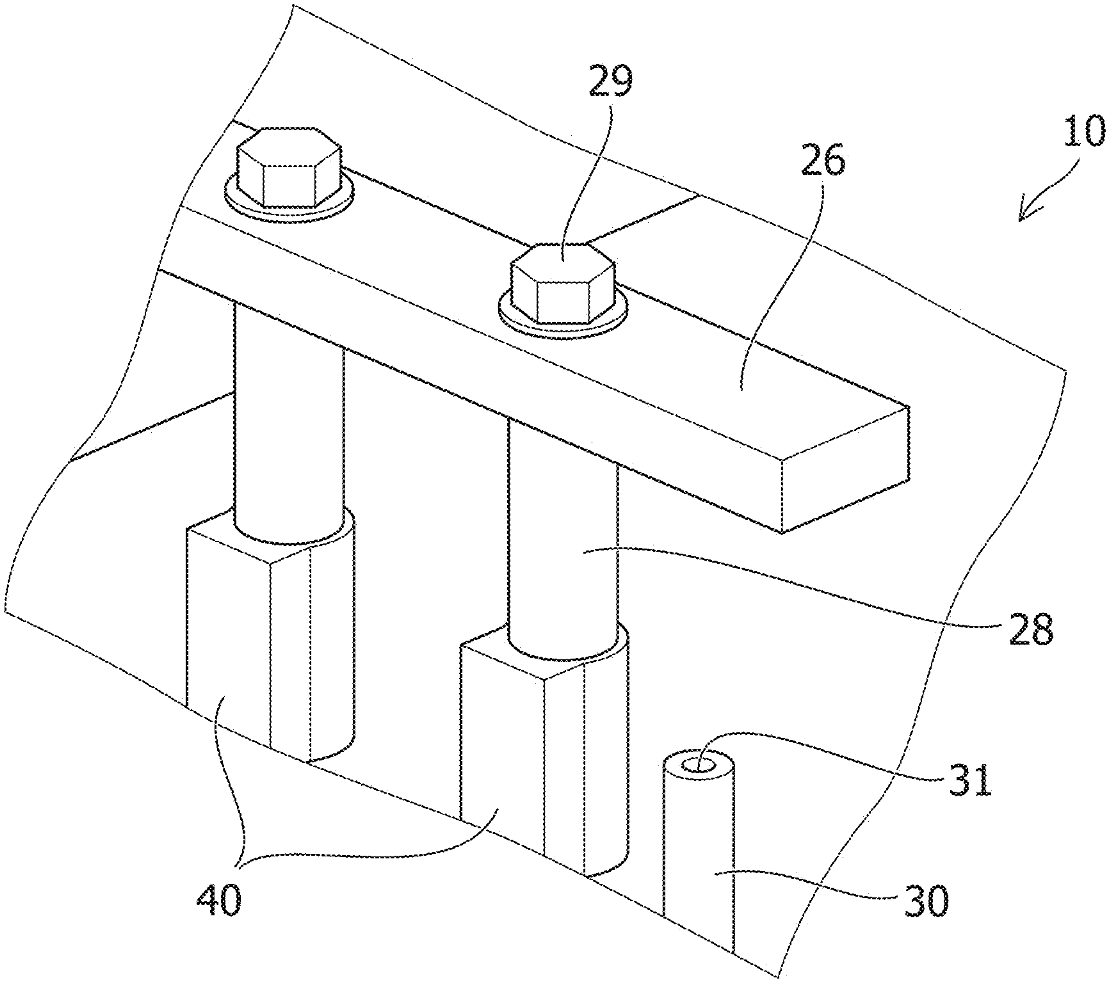
FIG. 9 is a perspective view schematically illustrating an example in which current-carrying bolts are installed in the second screw holes present on the outer peripheral surface of the cylinder block body for an outboard motor at the time of anodizing treatment step S3 in the flowchart shown in FIG. 5.
Figure 10:
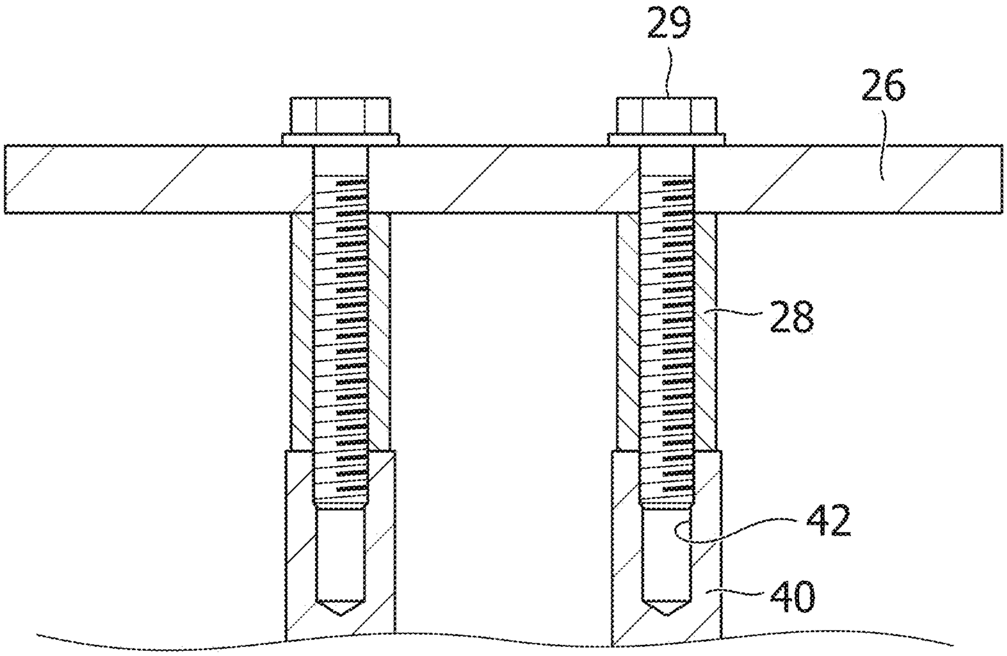
FIG. 10 is a cross-sectional view schematically illustrating the second screw holes and the current-carrying bolts illustrated in FIG. 9.

Then, as illustrated in FIG. 9 and FIG. 10, in order to fasten the anode busbar attachment sections 40 and the horizontal member (the anode busbar) 26 via the spacers 28, current-carrying bolts 29 are tightened into the second screw holes 42. In the anodizing treatment in the anodizing treatment step S3, by lowering the hanging section 24 of the carrying jig 20, the cylinder block body 10 can be immersed in the treatment liquid and electrolytic treatment can be carried out via the horizontal member (the anode busbar) 26. After the formation of the anodized film, by raising the hanging section 24, the cylinder block body 10 can be lifted from the treatment liquid. In the sealing treatment, although it is unnecessary to pass a current through the cylinder block body 10, in order to smoothly carry out the immersion in the treatment liquid, the sealing treatment may be carried out using the carrying jig 20. By carrying out the anodizing treatment step S3 as explained above, a sealed anodized film is formed in the inner circumferential portion of the first provisional hole 31 of the attachment section 30 of the member to be fastened. However, the anodized film is not formed in the inner circumferential portions of the second screw holes 42 of the anode busbar attachment sections 40.

Figure 11:
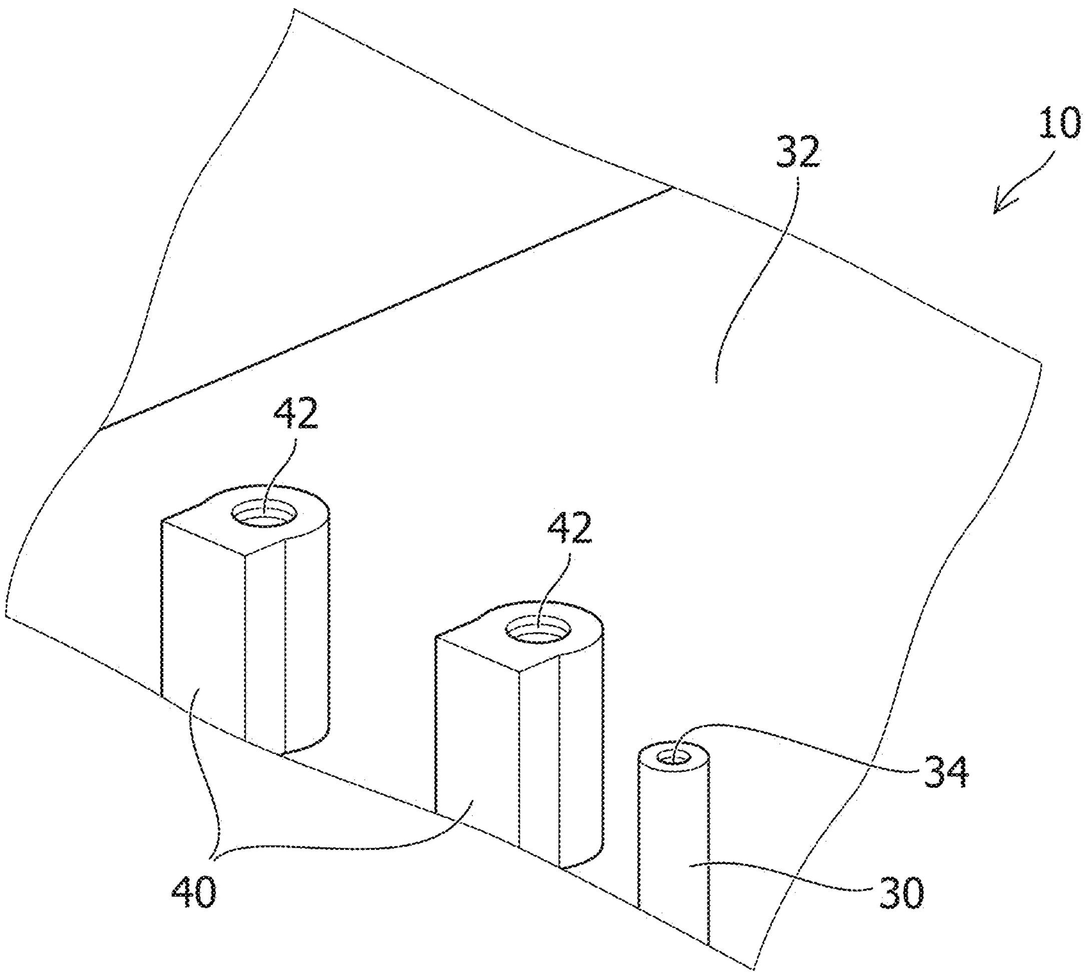
FIG. 11 is a perspective view schematically illustrating an example of the first screw hole and the second screw holes present on the outer peripheral surface of the cylinder block body for an outboard motor after finishing step S4 in the flowchart shown in FIG. 5.

In the finishing step S4, after the current-carrying bolts 29 are removed from the second screw holes 42 of the anode busbar attachment sections 40 and the cylinder block body 10 is detached from the carrying jig 20, the first provisional hole 31 of the attachment section 30 of the member to be fastened is threaded to form the first screw hole 34, as shown in FIG. 11. Accordingly, as explained above, the aluminum alloy which is the base material is exposed to the inner circumferential surface of the first screw hole 34. In the chemical conversion treatment step S5, by subjecting the cylinder block body 10 to the chemical conversion treatment, the aluminum alloy exposed on the inner circumferential surface of the first screw hole 34 of the attachment section 30 of the member to be fastened and the inner circumferential surfaces of the second screw holes 42 of the anode busbar attachment sections 40 can be covered with the chemical conversion coating film.

Figure 12:
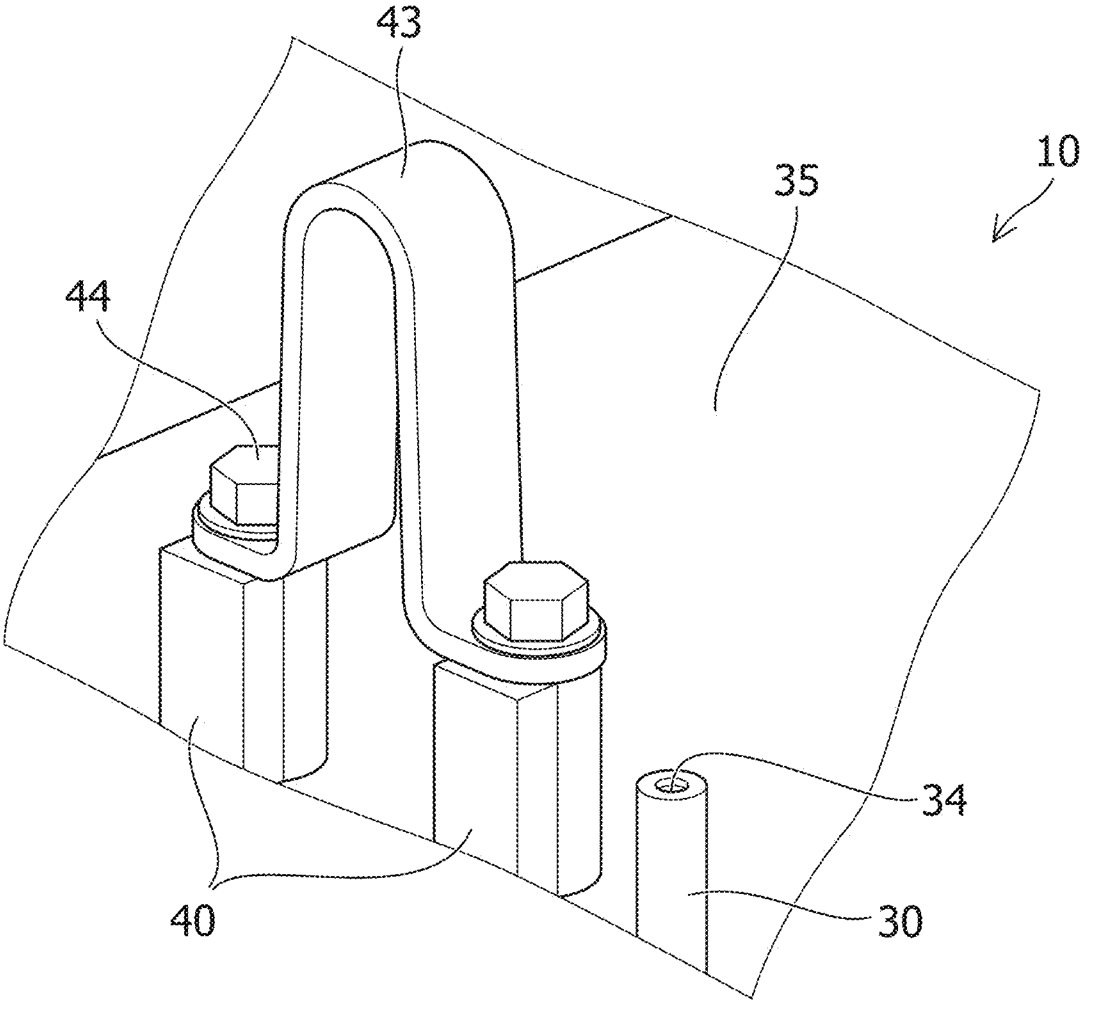
FIG. 12 is a perspective view schematically illustrating an example of use of the second screw holes present on the outer peripheral surface of the cylinder block body for an outboard motor after chemical conversion treatment step S5 in the flowchart shown in FIG. 5.

As explained above, in the second screw holes 42 of the anode busbar attachment sections 40, as in the first screw hole 34 of the attachment section 30 of the member to be fastened, only the thin chemical conversion treatment film is formed. Therefore, as illustrated in FIG. 12, the second screw holes 42 can be used as screw holes for bolts 44 for fastening an engine hook 43 for holding the outboard-motor cylinder block and the anode busbar attachment sections 40.

EXAMPLES

Example 1

A test material including screw holes (provisional holes) was manufactured using an ADC 12 material as an aluminum alloy, and after degreasing the test material, an anodizing treatment was carried out by the direct-current electrolytic method to form a 3 μm anodized film. Note that, in the anodizing treatment, a cylinder block was immersed in a sulphate bath having a temperature of 20 °C and a concentration of 200 g/L, and voltage was applied to the cylinder block for 20 minutes at a current density of 1.5 $A/dm^2$. After rinsing the cylinder block, low-temperature sealing treatment (40 °C, 3 minutes) using a compound containing fluorine, chromium, and zirconium as a primary component was carried out. Subsequently, finishing of inner circumferential surfaces of the screw holes was carried out using cutting liquid to remove the entire anodized film on the screw hole inner circumferential surfaces. After degreasing the entire test material in the same manner as before the anodizing treatment, a test piece was subjected to chemical conversion treatment (50 °C, 2 minutes) using chromate chemical conversion treatment liquid (product name ALSURF).

Comparative Example 1

A test material was manufactured in the same manner as in the Example 1 except that the finishing of the inner circumferential surfaces of the screw holes was carried out not between the sealing treatment and the chemical conversion treatment, but before the anodizing treatment, and the anodizing treatment, the sealing treatment, and the chemical conversion treatment were carried out.

Example 2

A test material was manufactured in the same manner as in Example 1 except that sealing treatment using nickel acetate as a primary component was carried out instead of the low-temperature sealing treatment, and the anodizing treatment, the sealing treatment, and the chemical conversion treatment were carried out.

Figure 13:
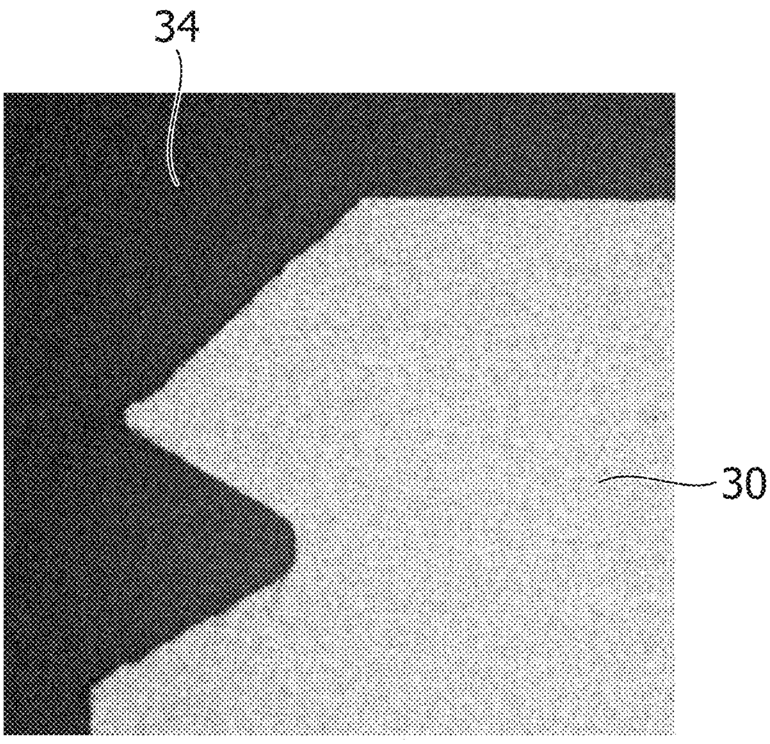
FIG. 13 is an image showing a cross-section of a screw hole inside in Example 1.
Figure 14:
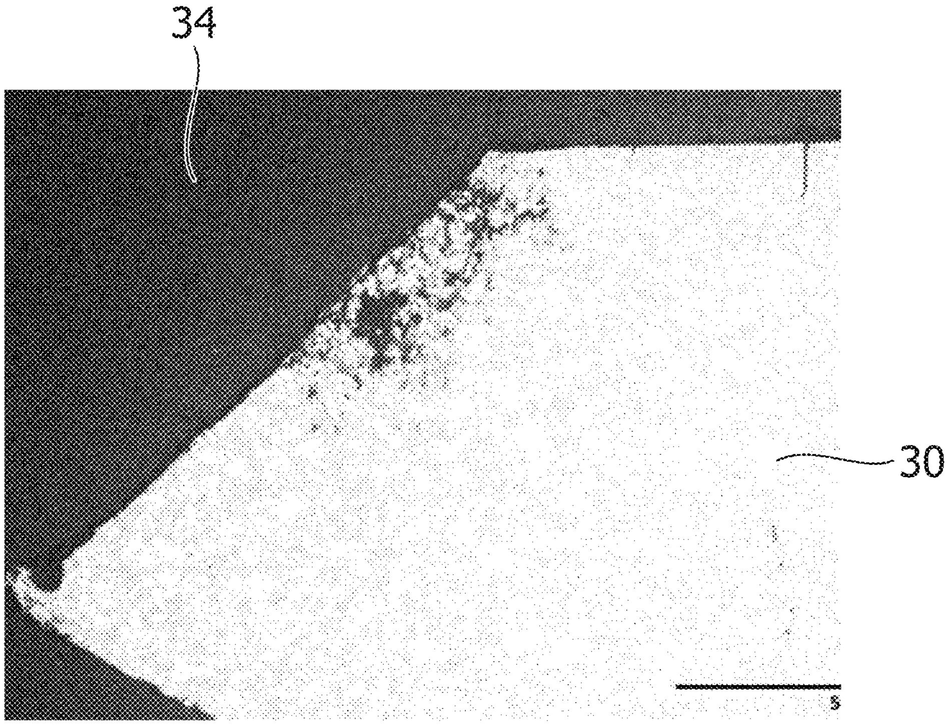
FIG. 14 is an image showing a cross-section of a screw hole inside in Comparative Example 1.

The insides of the screw holes of the test materials of the Example 1 and the Comparative Example 1 were visually inspected. As the results of the inspections, images of cross sections of screw hole portions after several days elapsed are illustrated in FIG. 13 and FIG. 14. As illustrated in FIG. 13, in the Example 1, corrosion was not seen in the inner circumferential portions of the screw holes, but corrosion was seen in the inner circumferential portions of the screw holes in Comparative Example 1. It was confirmed that this is an effect of removing the anodizing liquid by carrying out machining after carrying out the anodizing treatment.

Figure 15:
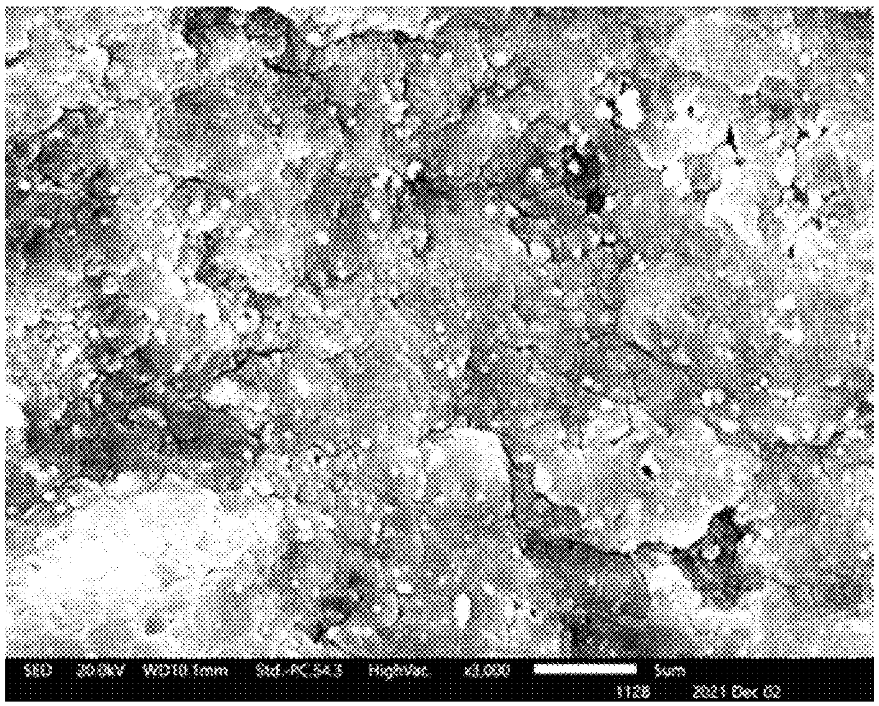
FIG. 15 is an SEM image showing a film surface before chemical conversion treatment in Example 1.
Figure 16:
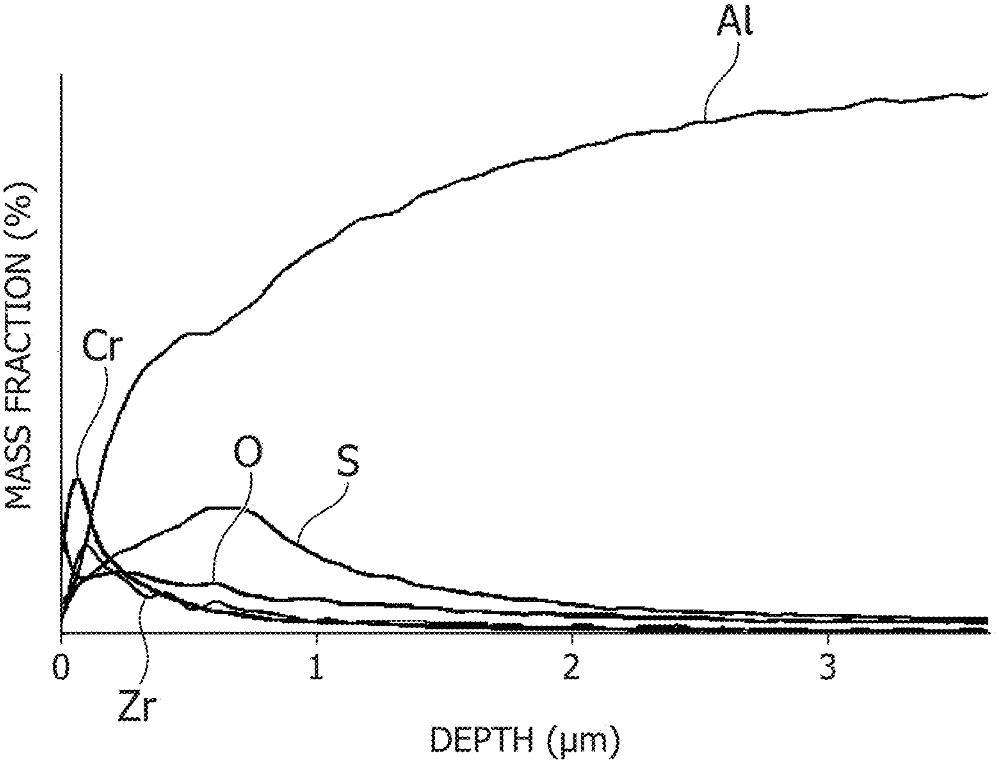
FIG. 16 is a graph showing the component analysis result in the depth direction of a film before the chemical conversion treatment in Example 1.
Figure 17:
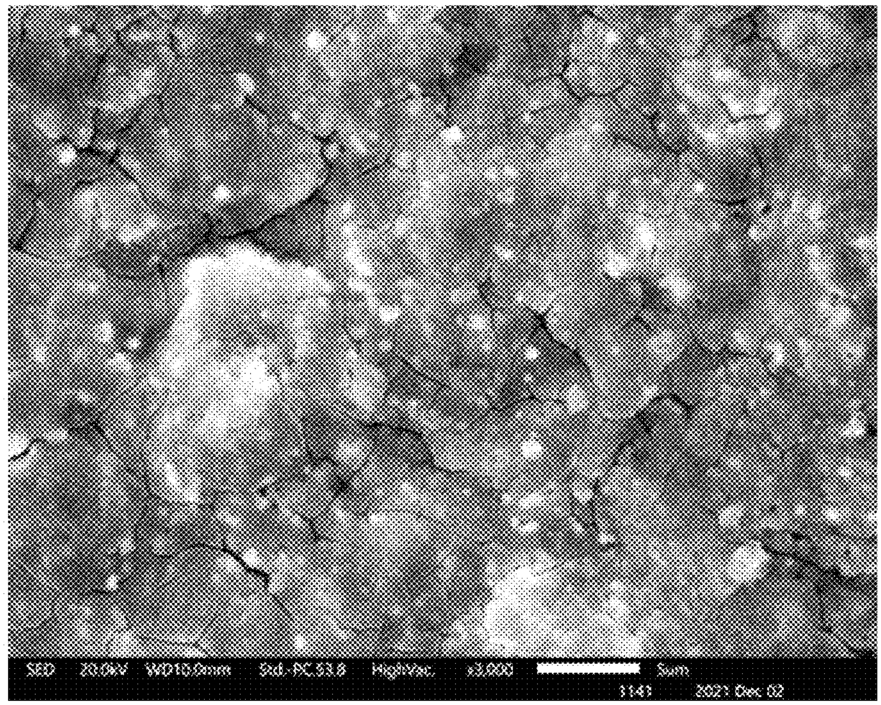
FIG. 17 is an SEM image showing a film surface after the chemical conversion treatment in Example 1.
Figure 18:
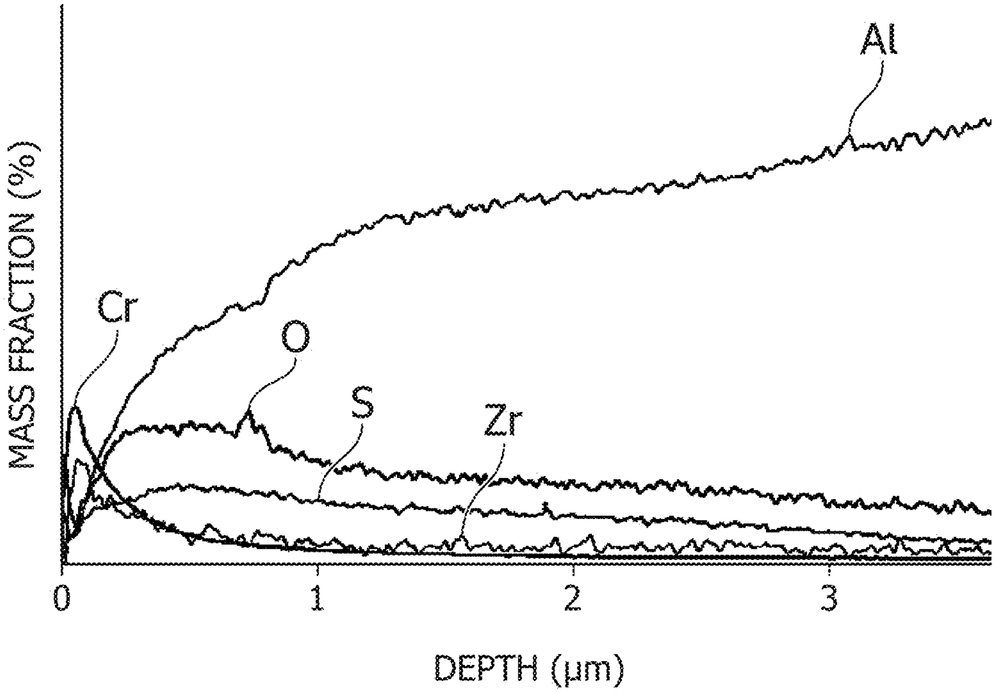
FIG. 18 is a graph showing the component analysis result in the depth direction of a film after the chemical conversion treatment in Example 1.
Figure 19:
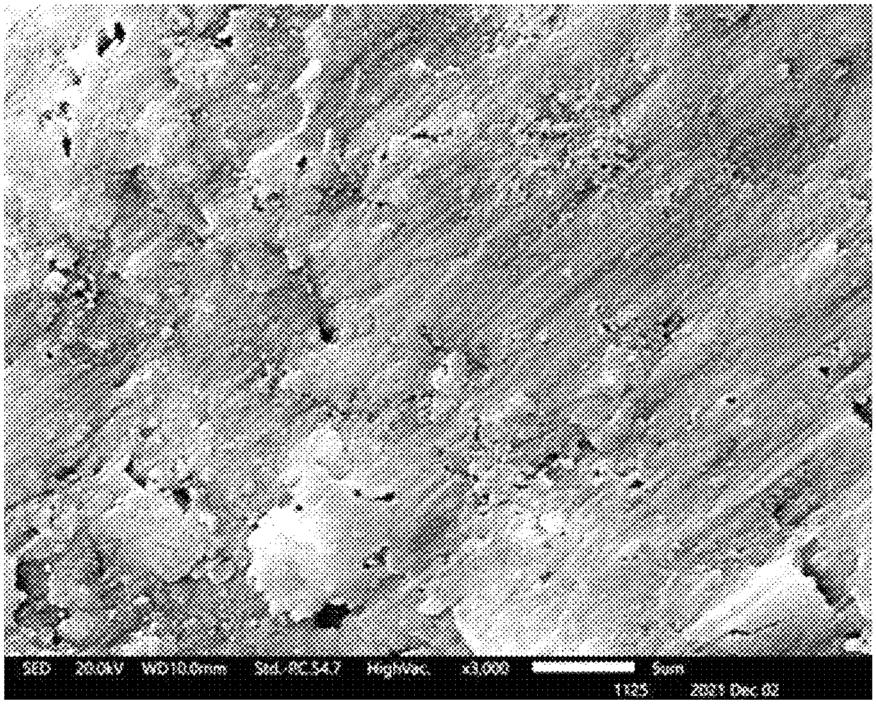
FIG. 19 is an SEM image showing a film surface before chemical conversion treatment in Comparative Example 2.
Figure 20:
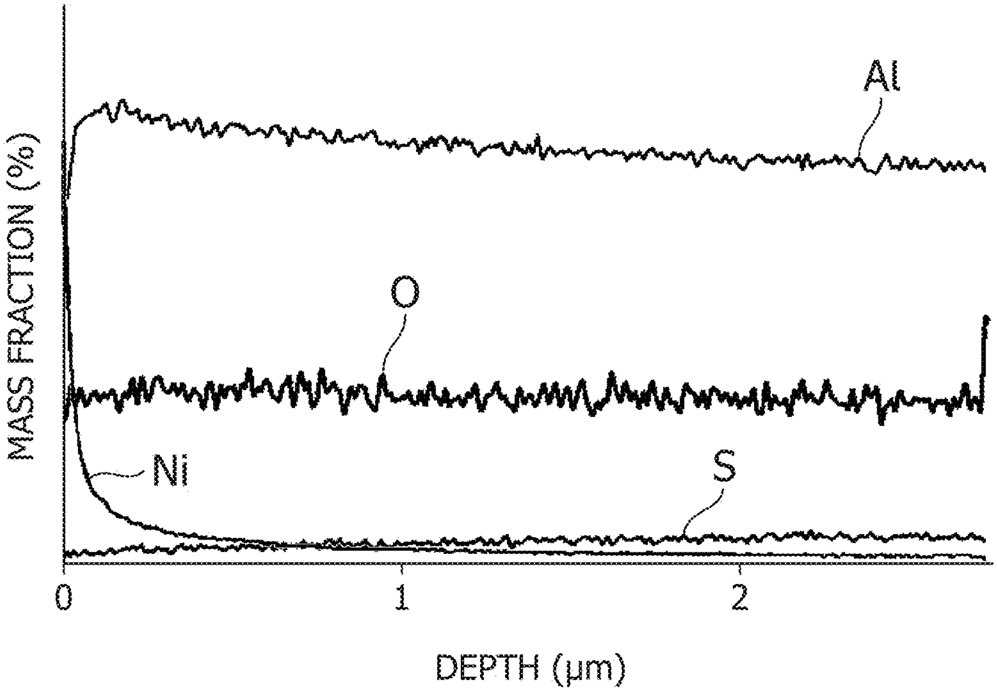
FIG. 20 is a graph showing the component analysis result in the depth direction of a film before the chemical conversion treatment in Comparative Example 2.
Figure 21:
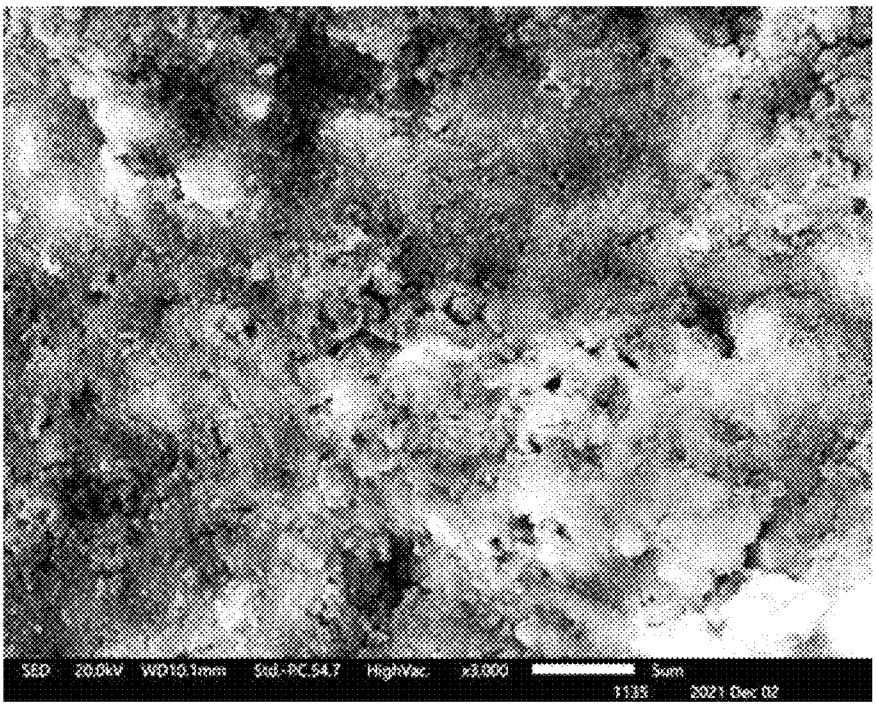
FIG. 21 is an SEM image showing a film surface after the chemical conversion treatment in Comparative Example 2.
Figure 22:
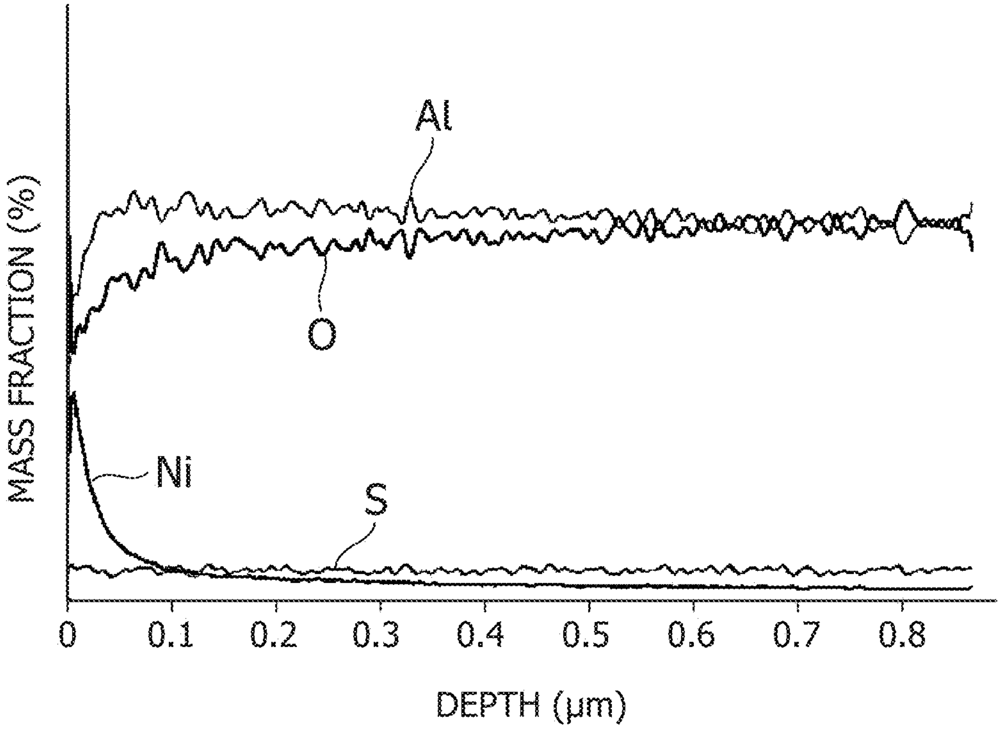
FIG. 22 is a graph showing the component analysis result in the depth direction of a film after the chemical conversion treatment in Comparative Example 2.

For films on the surfaces of the test materials of the Example 1 and the Example 2 before and after the chemical conversion treatment, a microstructure observation of the film surfaces by a field emission scanning electron microscope (FE-SEM) and a component analysis in the film depth direction by a glow discharge optical emission spectrometry (GDOES) were respectively carried out. Results before the chemical conversion treatment of the Example 1 are illustrated in FIG. 15 and FIG. 16 and results after the chemical conversion treatment of the Example 1 are illustrated in FIG. 17 and FIG. 18. Results before the chemical conversion treatment of the Example 2 are illustrated in FIG. 19 and FIG. 20, and results after the chemical conversion treatment of Example 2 are illustrated in FIG. 21 and FIG. 22.

In Example 1, changes were not seen on the film surfaces in SEM images in FIG. 15 and FIG. 17. In graphs illustrating mass fractions of elements in FIG. 16 and FIG. 18, decreasing states of sealing components such as chromium and zirconium were also not seen. On the other hand, in the Example 2, in SEM images in FIG. 19 and FIG. 21, it is seen that the film surface dissolved and was roughened in FIG. 21 after the chemical conversion treatment. In graphs illustrating mass fractions of elements in FIG. 20 and FIG. 21, nickel content, nickel being a sealing component, at a depth of approximately 0 μm, decreased. From these comparison results, it was confirmed that, by making the sealing component and the chemical conversion treatment component similar, the influence on the film can be reduced.

What is claimed is:

1. An outboard-motor cylinder block having a cylinder bore on a joining surface to be joined to a cylinder head and a water jacket around the cylinder bore, and having, on an outer peripheral surface thereof, a screw hole for fastening the outboard-motor cylinder block and a member to be fastened, wherein an aluminum alloy as a base material of the outboard-motor cylinder block is covered with an anodized film on a surface around an opening of the screw hole and an inner circumferential surface of the water jacket, pores of the anodized film being sealed with a sealing product, and the sealed anodized film being further covered with a chemical conversion coating film, and wherein the aluminum alloy is covered with the chemical conversion coating film on an inner circumferential surface of the screw hole.

2. The outboard-motor cylinder block according to claim 1, wherein the chemical conversion coating film contains the same component as a primary component of the sealing product.

3. The outboard-motor cylinder block according to claim 2, wherein the primary component of the sealing product is at least one selected from chromium and zirconium.

4. A method of manufacturing an outboard-motor cylinder block, the outboard-motor cylinder block having, on an outer peripheral surface thereof, a plurality of screw holes for fastening the outboard-motor cylinder block and a member to be fastened, the method comprising:

casting a cylinder block body using an aluminum alloy as a base material, the cylinder block body having a cylinder bore and a water jacket around the cylinder bore formed on a joining surface to be joined to a cylinder head, and having a provisional hole smaller in an inner diameter than the screw hole at a place where the screw hole is planned to be formed;

forming an anodized film on a surface of the cylinder block body where the aluminum alloy is exposed, by carrying out an anodizing treatment;

sealing pores of the anodized film to form a sealed anodized film by carrying out a sealing treatment;

threading the provisional hole to form the screw hole by removing the anodized film on an inner circumferential surface of the provisional hole such that the aluminum alloy is exposed to an inner circumferential surface of the screw hole; and forming a chemical conversion coating film on a surface of the sealed anodized film and a surface of the aluminum alloy exposed to the inner circumferential surface of the screw hole.

5. The method of manufacturing the outboard-motor cylinder block according to claim 4, wherein the plurality of screw holes comprises a first screw hole and a second screw hole, a first provisional hole for the first screw hole and a second provisional hole for the second screw hole being formed in the cylinder block body in the casting step, the method further comprises, before the step of forming the anodized film, threading the second provisional hole to form the second screw hole, and in the step of forming the anodized film, the anodizing treatment is carried out by passing an electric current through the cylinder block body via an anode busbar which is fastened to the cylinder block body with the second screw hole and a current-carrying bolt.

* * * * *